United States Patent
Eriksson et al.

(10) Patent No.: US 8,538,034 B2
(45) Date of Patent: Sep. 17, 2013

(54) METHOD AND ARRANGEMENT FOR ECHO CANCELLATION OF VOICE SIGNALS

(75) Inventors: Anders Eriksson, Uppsala (SE); Per Ahgren, Knivsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 784 days.

(21) Appl. No.: 12/744,733

(22) PCT Filed: Nov. 29, 2007

(86) PCT No.: PCT/SE2007/050920
§ 371 (c)(1),
(2), (4) Date: May 26, 2010

(87) PCT Pub. No.: WO2009/070073
PCT Pub. Date: Jun. 4, 2009

(65) Prior Publication Data
US 2010/0260344 A1 Oct. 14, 2010

(51) Int. Cl.
*H04B 3/20* (2006.01)

(52) U.S. Cl.
USPC ............... 381/66; 379/406.01; 379/406.06; 370/286

(58) Field of Classification Search
USPC ............ 381/66, 71.1–71.14, 94.1–94.9; 379/406.01–406.06; 370/286–292; 455/570; 704/E21.002, E21.007
See application file for complete search history.

(56) References Cited

U.S. PATENT DOCUMENTS

| | | | | |
|---|---|---|---|---|
| 5,566,167 | A * | 10/1996 | Duttweiler | 370/290 |
| 6,246,760 | B1 | 6/2001 | Makino et al. | |
| 6,421,377 | B1 * | 7/2002 | Langberg et al. | 375/222 |
| 6,853,626 | B1 * | 2/2005 | Farhang-Boroujeny et al. | 370/286 |
| 6,865,270 | B1 | 3/2005 | Troxel | |
| 6,944,289 | B2 * | 9/2005 | Tahernezhaadi et al. | 379/406.01 |
| 7,769,162 | B2 * | 8/2010 | Knutson et al. | 379/406.01 |
| 2002/0061012 | A1 | 5/2002 | Thi et al. | |
| 2007/0206817 | A1 | 9/2007 | Sakuraba et al. | |
| 2009/0304178 | A1 | 12/2009 | Takada | |

FOREIGN PATENT DOCUMENTS

| | | |
|---|---|---|
| EP | 0443547 A2 | 8/1991 |
| EP | 1677431 A1 | 7/2006 |
| GB | 2342549 A | 4/2000 |
| GB | 2344036 A | 5/2000 |
| JP | H04123606 A | 4/1992 |
| JP | H09148965 A | 6/1997 |
| JP | 2006352450 A | 12/2006 |
| JP | 2007235770 A | 9/2007 |
| WO | 2004/021679 A2 | 3/2004 |
| WO | 2004/082249 A1 | 9/2004 |

* cited by examiner

*Primary Examiner* — Vivian Chin
*Assistant Examiner* — Fatimat O Olaniran
(74) *Attorney, Agent, or Firm* — Coats and Bennett, P.L.L.C.

(57) ABSTRACT

A method and arrangement for cancelling echoes in a communication terminal (400) during a voice call with an opposite party. The communication terminal (400) comprises an echo cancelling unit (416,600) adapted to produce an estimate of echo information in received speech signals coming from a microphone in the communication terminal (400), and subtract the estimate from the received microphone signals, before being transmitted to the opposite party. The estimate is produced based on down-sampled received microphone signals and down-sampled received speech signals from the opposite party. The down-sampled speech signals from the opposite party are filtered in a digital filter (606), and the output signals from the filter (606) are up-sampled to form the estimate. Performing echo cancelling based on down-sampled speech signals from the opposite party and down-sampled microphone signals, requires a reduced amount of processing capacity of the communication terminal, still resulting in a sufficiently high quality echo cancellation.

26 Claims, 6 Drawing Sheets

METHOD AND ARRANGEMENT FOR ECHO CANCELLATION OF VOICE SIGNALS

TECHNICAL FIELD

The present invention relates generally to echo cancellation in digitally transferred voice communication, where two or more terminals are communicating. In particular, the present invention can be used where two parts are communicating speech via mobile phones.

BACKGROUND

In a digital voice communication system, speech is transferred between terminals of a speaking party and a listening party over a communication link. In this description, mobile terminals are communicating with each other in a mobile communicating system. However, the terminals can be any type of terminals for digitally transferred speech communication with a microphone and a loudspeaker. Furthermore, the voice communication system can be any type of system where two or more parties are communicating their speech, by transferring digitally encoded voice signals, e.g. a wireless or non-wireless telephony system, a conference telephony system, an entry phone system in a building, walkie-talkies, etc.

Figure 1A:
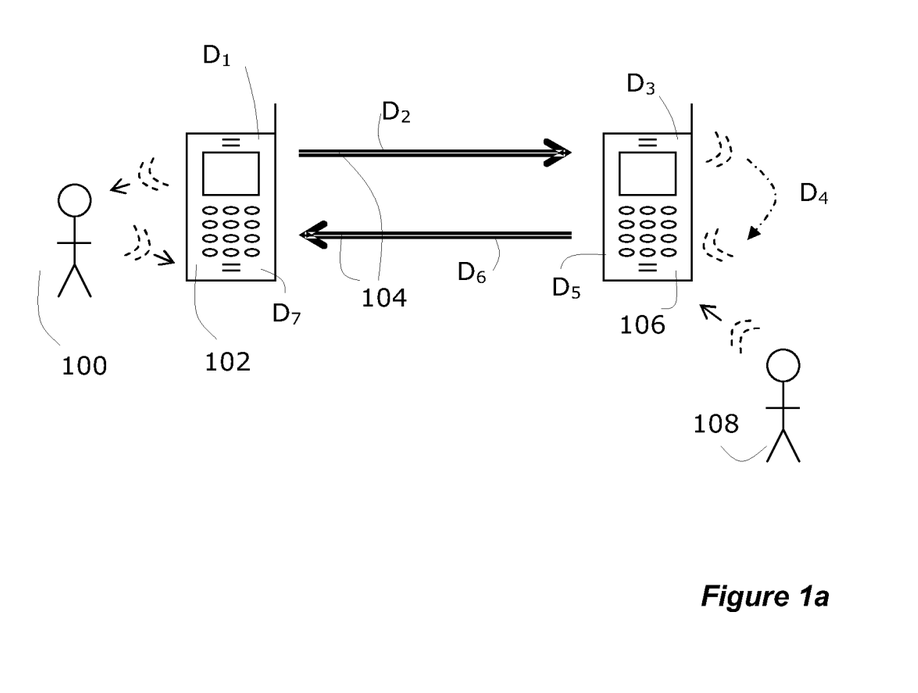
FIG. 1a is a basic overview illustrating a scenario where two persons are speaking in terminals over a digital communication link.

With reference to FIG. 1a, two persons 100 and 108 speaking with each other, use terminals 102 and 106, respectively, transmitting speech signals digitally across a communication link 104. Each terminal has a microphone and a loudspeaker. When person 100 is speaking in the microphone of terminal 102, his or her speech is transferred across the communication link 104, and is emitted from the loudspeaker of terminal 106. The speech emitted from the loudspeaker is picked up by the microphone of terminal 106, together with the speech of person 108, resulting in a combined signal to the opposite terminal 102. This combined signal is transferred across the communication link 104 to terminal 102, where person 100 hears it in his or her loudspeaker.

In this process, the speech picked up by the microphone of terminal 102 is converted into digital signals at terminal 102, and is then converted back to analogue signals at terminal 106, before being emitted as speech by the loudspeaker of terminal 106. Correspondingly, the speech picked up by the microphone of terminal 106 is converted into digital signals at terminal 106, which are converted back to analogue signals at terminal 102, before being emitted as speech by the loudspeaker of terminal 102.

Figure 1B:
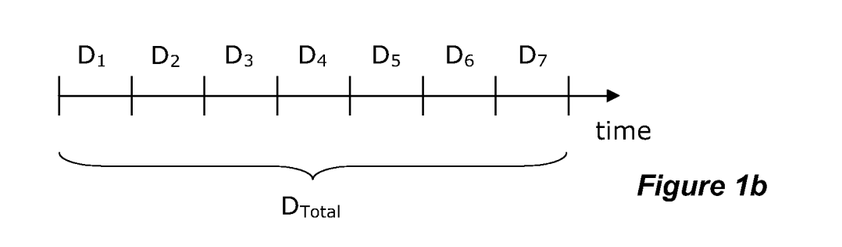
FIG. 1b is a diagram illustrating different time delay parts of an echo typically occurring in digital communication.

During the transfer from the microphone of terminal 102 to the loudspeaker of terminal 106, the speech is delayed, due to digital processing of the signals in both terminals 102 and 106, and in any intermediate routers, gateways, etc. present at the communication link 104, as well as due to propagation path delay. Such processes are e.g. analogue-to-digital or digital-to-analogue conversion (A/D and D/A, respectively), speech coding, speech buffering, or any other digital processes associated with speech communication. The reproduced voice signals from the loudspeaker of terminal 102 are delayed because of the above described conversion, processing, and propagation. FIG. 1b shows how the total delay $D_{Total}$ of speech entering the microphone of terminal 102 until emitted by the loudspeaker of terminal 102 basically includes the following six parts also indicated in FIG. 1a: $D_1$, arising from the A/D conversion and signal processing at terminal 102; $D_2$, arising from the signal processing and propagation path delay on the communication link 104; $D_3$, arising from the D/A conversion and signal processing at terminal 106; $D_4$, arising from the speech propagation from the loudspeaker of terminal 106 to the microphone of terminal 106; $D_5$, arising from the A/D conversion and signal processing at terminal 106; $D_6$, arising from the signal processing and the propagation path delay on the communication link 104; and $D_7$, arising from the D/A conversion and signal processing at terminal 102. As a result, person 100, using terminal 102, hears his or her own speech as a delayed echo, which is naturally perceived as disturbing. Typically, the delay $D_{Total}$ of the perceived echo is in the range of 30-500 ms.

For reducing echoes in a digital voice communication system two methods are generally applied today, referred to as echo suppression and linear filtering based echo cancellation.
Echo Suppressors An echo suppressor is typically used in mobile terminals such as terminals 102 and 106, temporarily blocking the frequencies of the output signals to the communication link 104 when echoes are detected to be present. A common echo suppressor is the Non-Linear Processor, NLP. To determine when echoes are present and for which frequencies, the NLP in terminal 106 receives information about the frequencies of the incoming signals on the communication link 104. It also receives information about the frequencies of the microphone signals of terminal 106. A terminal (e.g. 102 and 106) determines whether it currently the speech sending or the speech receiving party. If a terminal 106 determines that it is the speech receiving party, it temporarily blocks frequencies, being the same in the microphone signals of the terminal 106 and in the incoming signals on the communication link 104, from being transmitted on the communication link 104 to the opposite terminal 102. Similarly, if a terminal 102 determines that it is the receiver it temporarily blocks frequencies, being the same in the microphone signals of terminal 102 and the incoming signals on the communication link 104, from being transmitted on the communication link 104 to the opposite terminal 106.

Alternatively, the NLP in the terminals can be designed to detect when echo is dominating the speech of the user of the terminal, and block these frequencies.

An advantage of the echo suppressor is that almost no echo remains for the blocked frequencies. However, there are some drawbacks: Frequencies in the background sound are temporarily blocked, resulting in loss of naturalness. In double-talk, when two persons are speaking simultaneously, frequencies in the speech of one party are temporarily blocked, which also affects the emitted speech of the other party.
Linear Filtering Based Echo Cancellers Typically, a linear filtering based echo canceller is also used in mobile terminals such as terminals 102 and 106. Thus, the linear filtering based echo canceller in terminal 106 estimates the part of the microphone signal of terminal 106, arising from the speech of person 100, which is emitted by the loudspeaker of terminal 106, and subtracts it from the signals to be transmitted back to terminal 102. To estimate the echo of the speech, a digital filter is used. An advantage of linear filtering based echo cancellers is that they preserve the naturalness of speech, because they do not block frequencies from the background sound or the other speaking party. However, linear filtering based echo cancellers also have some drawbacks: They may leave a noticeable remaining echo due to that the digital filter does not completely model the echo, and require a great amount of processing capacity to achieve a sufficient echo reduction.

For providing an estimate of the required processing capacity, the following example is given:

The calculation rate C is the product of a sampling frequency f and a filter length l, i.e. $C = f \times l$, where the filter length l is the product of the sampling frequency f and echo delay t, l=f×t. In other words C=f²×t. For an echo t of 100 ms and a sampling frequency f of 8 kHz, the calculation rate C is 8000² Hz×0.1 s=6.4 million operations per second (MOPS). For 16 kHz, 25.6 MOPS will be necessary. For 32 kHz, 102.4 MOPS, and for 48 kHz, 230.4 MOPS are required.

Combinations

Echo suppressors and linear filtering based echo cancellers are thus both associated with some drawbacks, therefore combinations using both techniques are mostly used, designed to combine the advantages and avoid the drawbacks. Hereinafter, the term "echo canceller" refers to any combination of linear filtering based echo cancellers with or without echo suppressors.

Figure 2:
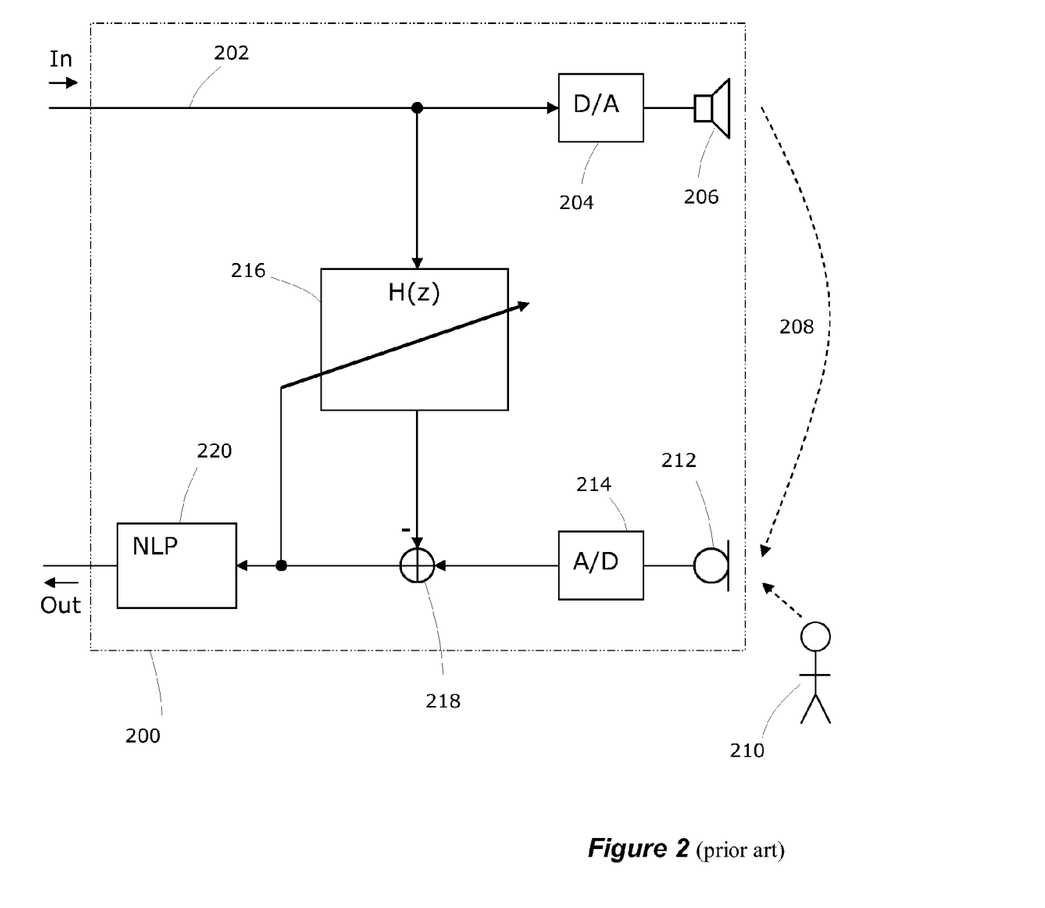
FIG. 2 is a block diagram illustrating a combination of an echo canceller and an echo suppressor, according to the prior art.

With reference to FIG. 2, an example of a typical design of an echo canceller will now be briefly described. The echo canceller is placed in a terminal 200 used by a person 210 during a voice call with an opposite terminal (not shown). The incoming signals on the communication link 202 are converted to analogue voice signals by the D/A-converter 204, which are emitted by the loudspeaker 206 of terminal 200. The microphone 212 of terminal 200 thus receives both the speech of person 210 and the speech from the opposite terminal, emitted from the loudspeaker 206 and affected by the environment 208 of terminal 200. An A/D converter 214 takes as input the signals from the microphone 212, and outputs digital signals, representing the microphone signals, to a subtracter 218.

The echo canceller also includes an adaptive digital filter 216, which receives the incoming signals from the communication link 202 from the opposite terminal, and the filter 216 also receives the output signals from the subtracter 218, and produces output signals. The output signals from the echo canceller are fed as input signals to the subtracter 218. The output signals from the filter 216 are then subtracted from the A/D-converted signal at the subtracter 218. Thus, the output signals from the subtracter 218 represent the difference between the A/D-converted microphone signals and the output signals from the filter 216. The filter coefficients of filter 216 are determined dynamically (adapted) based on the A/D-converted microphone signals of terminal 200, i.e. the filter coefficients are updated continuously. The continuous update is needed because the environment 208 of terminal 200 changes. The filter 216 processes the signals received on the communication link 202. Thus, the output signals from the filter 216 represent an estimate of the part of the output signals from the A/D-converter 214 which originates from the loudspeaker 206 of terminal 200. These estimated signals will be subtracted, by the subtracter 218, from the output signals from the A/D-converter 214 to achieve an adequate echo cancellation. The output signals from the subtracter 218 are finally processed by a Non-Linear Processor (NLP) 220 to suppress any remaining echoes, before being transferred to the opposite terminal (not shown).

Figure 3:
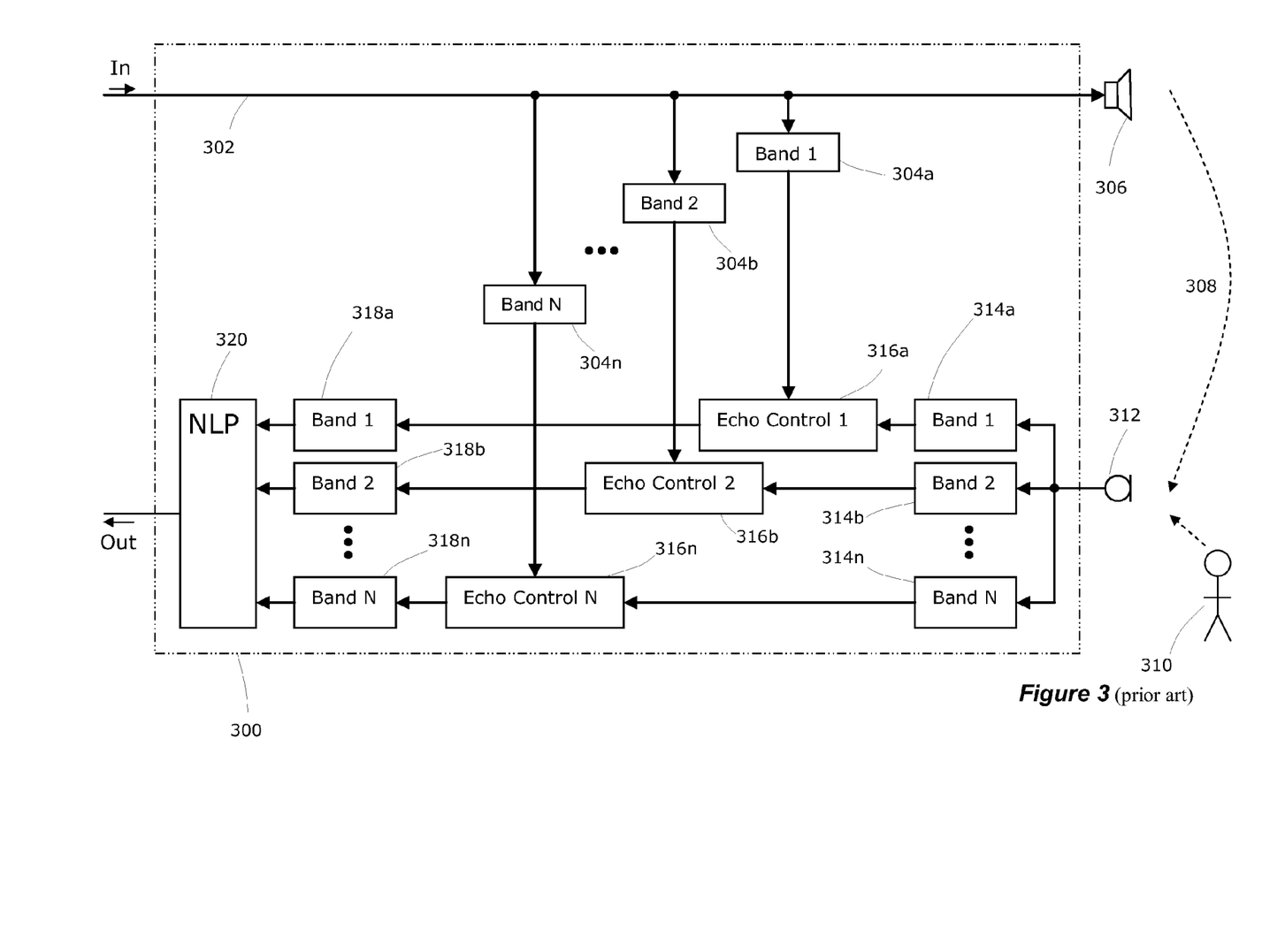
FIG. 3 is a block diagram illustrating another combination of a band-divided echo canceller and an echo suppressor, according to the prior art.

With reference to FIG. 3, another known design of an echo canceller will be described. This echo canceller is placed in a terminal 300 operated by a person 310. Basically, the signals on the incoming communication link 302 are divided into a plurality of frequency bands which are processed individually before being combined together into a composite signal.

Both the signals on the communication link 302 and the signals from the microphone 312 are divided into a plurality of frequency bands 1,2,...,N by a number of filters 304 a,b, ..., n and 314 a,b,..., n, respectively. Before the signals on the communication link 302 are emitted by the loudspeaker, they are converted by a D/A-converter (not shown) to analogue speech signals, and after the emitted sounds have been received by the microphone 312 they are converted by an A/D-converter (not shown). The speech emitted by the loudspeaker 306 is heard by person 310, and is also being picked up, affected by the environment 308 of terminal 300, by the microphone 312.

For each band filtered by the respective filter pairs 304a/314a, 304b/314b, ..., 304n/314n an echo control unit 316 performs echo cancellation, as described above, on the respective band. Each frequency band is then filtered by a respective filter 318 a,b,..., n, and echo suppressed by the NLP 320 in the manner described above. Finally, the filtered and echo suppressed frequency bands are combined into a composite signal in the NLP 320, before being transferred to the opposite terminal (not shown).

An advantage of the described echo canceller is that the required processing capacity will be decreased, because the sampling rate can be reduced when the signals to be echo cancelled is divided into separate frequency bands. As the sample rate is reduced, the required processing capacity decreases with the square of the sample rate reduction. The following example will show how the calculation rate C for the above described echo canceller is decreased:

As described above, the formula for the calculation rate is defined as C=f²×l. For a sampling frequency f=20 kHz and an echo delay l=100 ms, the calculation rate C is 20000² Hz×0.1 s=40 MOPS. If the signals are instead divided into 4 separate frequency bands, each having the sampling frequency 5 kHz, the calculation rate for each frequency band C is 5000² Hz×0.1 s=2.5 MOPS. For the 4 frequency bands in total the calculation rate $C_{tot}$ is then 4×2.5 MOPS=10.0 MOPS. Thus, dividing the signals to be echo cancelled into 4 bands decreases the calculation rate from 40 MOPS to 10 MOPS, i.e. the total calculation rate is decreased by a factor 4.

Another advantage of the echo canceller is that different linear filtering based echo cancellers can be used for the respective bands. If, e.g., most of the echo is present in the lower frequency range, and less in the higher frequency range, then a complex echo canceller, resulting in a small remaining echo, can be used for the lower frequency range, and a less complex one can be used for the higher frequency range. However, a drawback of the described echo canceller is that the process of combining the bands into an acceptable composite signal is relatively complex.

Hence, there are certain problems associated with the existing solutions outlined above. Even with a combination of echo suppressors and linear filtering based echo cancellers it is a problem, considering the limited processing capacity of the terminal, to design an apparatus producing a remaining echo from the linear filtering based echo cancellers that is small enough to be suppressed by the echo suppressors, without losing the naturalness of the resulting speech signals.

Another problem is that in situations with a band-divided echo canceller, the design of the summary function for the bands is very complex. This is due e.g. to the fact that the filter characteristics for the bands are not ideal in practice, and that plural different echo control units are used for the respective bands.

SUMMARY

It is an object of the present invention to address at least some of the problems outlined above. Furthermore, it is an object of the present invention to provide a solution for enabling an effective cancelling of echoes in a communication terminal, requiring a reduced amount of processing capacity, during voice communication over a communication link.

These objects and others may be obtained by a method and an apparatus according to the attached independent claims.

According to one aspect, a method is provided for cancelling echoes in a communication terminal during a voice call with an opposite party. The communication terminal comprises a loudspeaker, a microphone, and an echo cancelling unit. When cancelling echoes, the echo cancelling unit receives speech signals from the opposite party and speech signals from the microphone. The microphone signals are fed into a first and a second branch, where in the first branch a first estimate of the echo information in the microphone signals is produced, based on the received speech signals from the opposite party and the received microphone signals. Finally, the estimate is subtracted from the signals fed into the second branch, resulting in an echo cancelled speech signal to be transmitted to the opposite party. When producing the first estimate, the received microphone signals in the first branch are down-sampled with a down-sampling factor i, and the received speech signals from the opposite party are down-sampled with the same down-sampling factor i. The down-sampled speech signals from the opposite party are filtered by a digital filter, resulting in a second estimate. The second estimate is then up-sampled with an up-sampling factor i, being equal to the down-sampling factor i, forming the first estimate.

According to another aspect, an arrangement in a communication terminal is provided for cancelling echoes during a voice call with an opposite party. The communication terminal comprises a loudspeaker, a microphone, and an echo cancelling unit. The echo cancelling unit is adapted to receive speech signals from the opposite party and speech signals from the microphone. The echo cancelling unit comprises a first and a second branch, where the first branch is adapted to receive the microphone signals and produce an estimate of the echo information in the microphone signals, based on the received speech signals from the opposite party and the received microphone signals. The second branch is adapted to receive the microphone signals, and a subtracter is adapted to subtract the produced estimate from the signals in the second branch. The echo cancelling unit further comprises a first down-sampler adapted to down-sample the received microphone signals in the first branch with a down-sampling factor i, and a second down-sampler adapted to down-sample the received speech signals from the opposite party with the same down-sampling factor i. Furthermore, the echo cancelling unit comprises a digital filter which is adapted to filter the down-sampled speech signals from the opposite party to produce a second estimate, and an up-sampler adapted to up-sample the second estimate with a factor i, being equal to the down-sampling factor i, resulting in the first estimate. Performing echo cancelling based on down-sampled speech signals from the opposite party and down-sampled microphone signals, may require a relatively small amount of processing capacity of the communication terminal, still resulting in a sufficiently high quality echo cancellation.

According to a further aspect, a method is provided for cancelling echoes in a communication terminal during a voice call with an opposite party. The communication terminal comprises a loudspeaker, a microphone, and an echo cancelling unit. When cancelling echoes, the echo cancelling unit receives information about the currently available processing capacity of the communication terminal, selects a suitable echo cancelling procedure based on the currently available processing capacity, and applies the selected echo cancelling procedure. The echo cancelling procedure is selected from a plurality of selectable echo cancelling procedures in the echo cancelling unit. Furthermore, the echo cancelling procedure comprises the steps of, down-sampling incoming speech signals on a communication link, filtering the down-sampled signals in an adaptive filter, up-sampling the filtered signals, and subtracting the up-sampled signals from speech signals coming from the microphone.

According to a still further aspect, an arrangement in a communication terminal is provided for cancelling echoes during a voice call with an opposite party. The communication terminal comprises a capacity indicator adapted to indicate the currently available processing capacity of the communication terminal, a control unit adapted to select one available echo cancelling procedure, based on the currently available processing capacity, and an echo cancelling unit adapted to apply the selected echo cancelling procedure. Furthermore, the echo cancelling procedure comprises the steps of, down-sampling incoming speech signals on a communication link, filtering the down-sampled signals in an adaptive filter, up-sampling the filtered signals, and subtracting the up-sampled signals from speech signals coming from the microphone. Varying the echo cancelling procedure due to the currently available processing capacity of the communication terminal may result in a flexible and efficient using of the processing capacity of the communication terminal.

Different embodiments of the methods and arrangements in the communication terminal above are possible. For example, the echo cancelling unit may select the down-sampling and up-sampling factor i from a plurality of values, where each of the values represents a separate available echo cancelling procedure. The echo cancelling procedure may be selected based on the available processing capacity of the communication terminal. The signals in the second branch may be delayed by a time t, being equal to the time delay being introduced in the production of the estimate, before the first estimate is subtracted from the signals. The digital filter may be adaptive, and the down-sampled microphone signals may be used for adapting the filter. An echo suppressor may be adapted for suppressing any remaining echoes from the echo cancelling unit.

Further features and benefits of the present invention will become apparent from the detailed description.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a solution where a voice communication terminal, during speech communication with an opposite terminal, can achieve echo cancelling of the microphone signals more effectively and requiring less processing capacity, before transmitting the signals to the opposite terminal. An estimate of the part of the microphone signals comprising the majority of the echo information is produced by down-sampling incoming speech signals on the communication link from the opposite terminal, filtering the down-sampled signals in an adaptive filter, and up-sampling the output signals from the adaptive filter. Finally, the echo estimate is subtracted from the microphone signals.

The present invention also provides a solution where a voice communication terminal, during speech communication with an opposite terminal, can detect its own currently available processing capacity, and depending on the detected processing capacity adjust its own echo cancelling procedure to a suitable one. The terminal detects the available processing capacity, and based on that capacity, it determines a suitable echo cancelling procedure. Then, the terminal checks whether the currently used procedure is the same as the determined one. If the procedures are not the same, the terminal replaces the procedure with the determined one, and continues to receive information about the currently available processing capacity. On the other hand, if the procedures are the same it is not necessary to replace the procedure and the terminal continues to receive information about the currently available processing capacity.

Alternatively, it is also possible to use the echo cancelling method described above, regardless of the available processing capacity of the terminal, i.e. without adjusting the echo cancelling procedure based on the currently used processing capacity.

Throughout this description, the term "speech" refers to any form of voice sounds. An "echo canceller" can be any combination of linear filtering based echo cancellers with or without echo suppressors. The term "echo information in the microphone signals" is the part of the received microphone signals originating from the loudspeaker. In the following examples, it is assumed that FIR-NLMS (Finite Impulse Response-Normalised Least Mean Square) is used as the filtering method for the estimation. However, the filter can also use any other suitable adaptive or non-adaptive method, e.g. NLMS (Normalised Least Mean Square), RLS (Recursive Least Square), LS (Least Square), etc.

Figure 4:
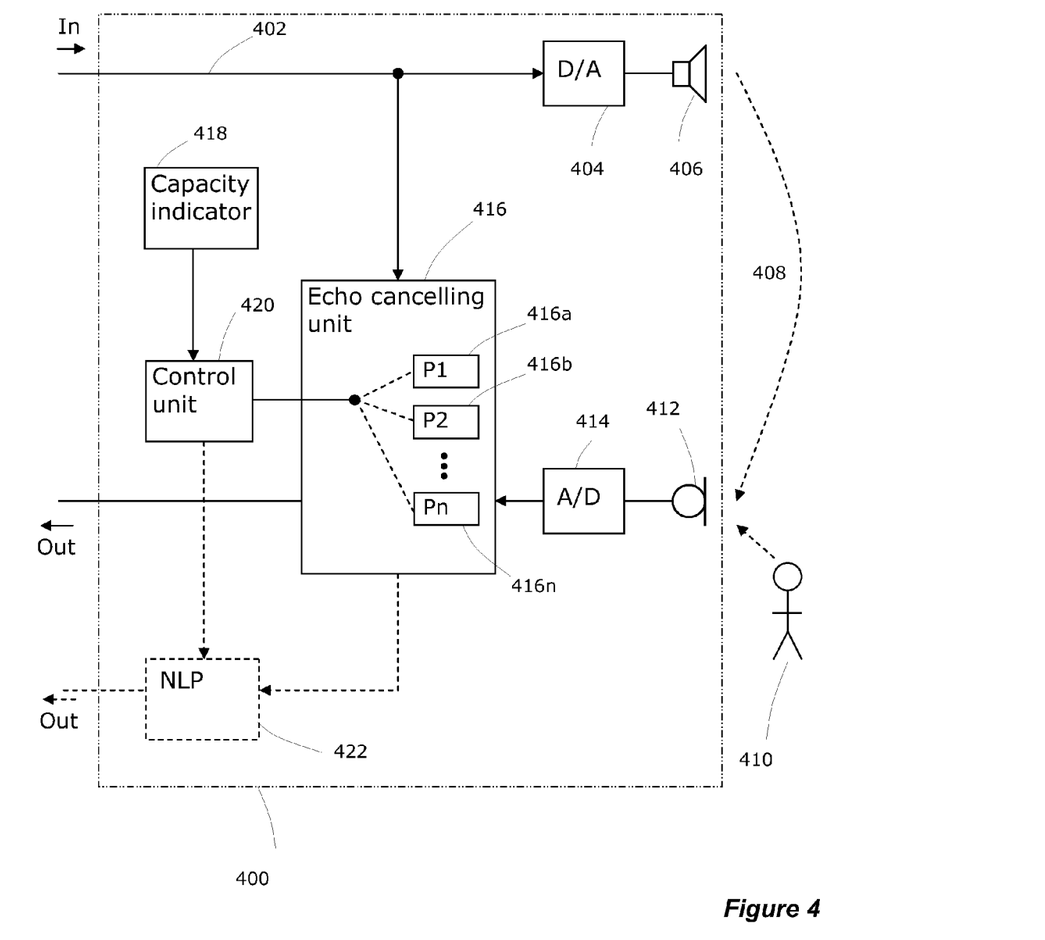
FIG. 4 is a block diagram illustrating a combination of an echo canceller and an echo suppressor, in accordance with one embodiment.

With reference to FIG. 4, an embodiment of an arrangement for echo cancelling will now be described. A terminal 400 is used by a person 410, during a voice call with an opposite terminal (not shown). The incoming digital speech signals arriving on a communication link 402 are converted by a D/A-converter 404 into analogue voice signals, which are emitted by a loudspeaker 406 of terminal 400. A microphone 412 of terminal 400 receives both the speech of person 410 and the speech from the opposite terminal, emitted from the loudspeaker 406 and affected by the environment 408 of terminal 400. The microphone signals from the microphone 412 are converted by an A/D-converter 414 into digital signals. The terminal also includes an echo cancelling unit 416, which takes as input the signals from the communication link 402 from the opposite terminal and also the A/D-converted signals from the microphone 412 of terminal 400, and produces an output signal. The processed output signal is finally further processed by a Non-Linear Processor (NLP) 422, to e.g. suppress any remaining echoes, before being transferred to the opposite terminal (not shown). The echo cancelling unit 416 can apply one of a plurality of selectable echo cancelling procedures, 416a, 416b, ..., which is selected depending on the currently available processing capacity of the terminal 400. The echo cancelling procedures 416a, 416b, ... require different amounts of available processing capacity.

For example, if a large currently available processing capacity is detected, a more rigorous echo cancelling procedure, requiring more processing capacity, will be used. When, on the other hand, less currently available processing capacity is detected, a less rigorous echo cancelling procedure, requiring less processing capacity, will be used.

A capacity indicator 418 indicates the currently available processing capacity of the terminal 400, and provides this value as input to a control unit 420. The available processing capacity varies, due to different ongoing processes in the terminal. The capacity indicator 418 monitors one or more processors (not shown) of the terminal 410 to receive information of the currently available processing capacity.

The control unit 420 then accordingly selects a suitable echo cancelling procedure 416a, 416b, ..., and also provides information about the selected echo cancelling procedure 416a, 416b, ... to the NLP 422, which adjusts its algorithms depending on the selected echo cancelling procedure 416a, 416b, .... An advantage of the present invention is that the echo cancelling procedure can be adjusted due to the currently available processing capacity. In other words, when just a small amount of processing capacity is used for other processing in the terminal 400, more processing capacity of the terminal 400 can be used for echo cancelling, resulting in a better echo cancellation. When on the other hand more processing capacity of the terminal 400 is required for other processing, a less capacity requiring procedure, still resulting in sufficient echo cancelling, can be used. In this way, the speech quality can be optimised without compromising the processing requirements of other activities in the terminal 400. An example of such a procedure, requiring less processing capacity but nevertheless resulting in sufficient echo cancellation, is described below in accordance with FIG. 6. In practice, an NLP is used for suppressing any remaining echoes in the output signals from the echo cancelling unit 416. However, other circuits can be also be used for removing potential remaining echoes. For an echo cancelling unit producing only minor remaining echoes, the NLP may be excluded. Therefore, the NLP is optional and not necessary for the present invention.

Figure 5:
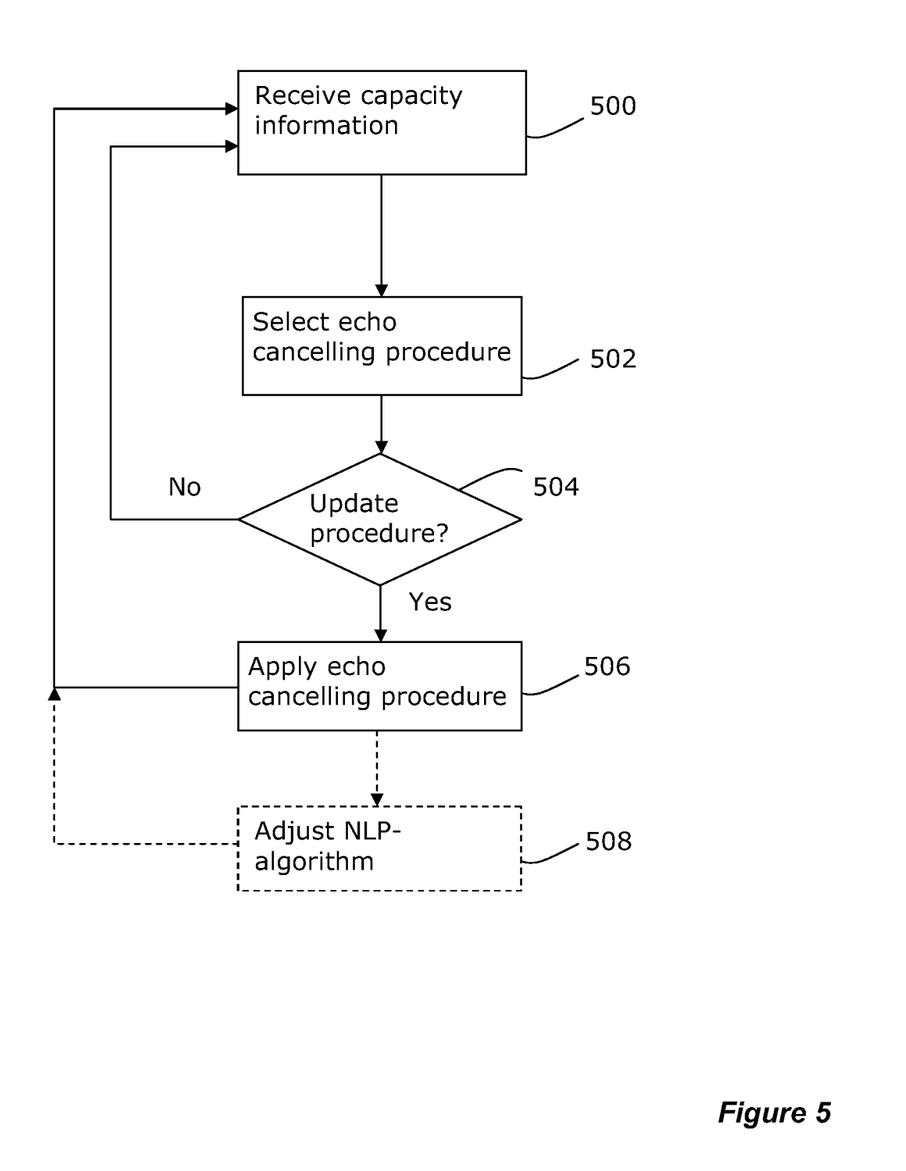
FIG. 5 is a flow chart illustrating a method for controlling the echo canceller, in accordance with another embodiment.

With reference to FIG. 5, illustrating a flow chart with steps executed in a communication terminal operated by a user, a process of selecting an echo cancelling method in accordance with another embodiment will now be described. The terminal is capable of using different echo cancelling procedures depending on the currently available capacity. In a first step 500, an indication of the available processing capacity is more or less continuously received from a capacity indicator or the like. In a next step 502, a suitable echo cancelling procedure is selected, depending on the available processing capacity. In a next step 504, depending on whether the presently applied echo cancelling procedure and the echo cancelling procedure selected in step 502 are the same or not, it is decided whether the procedure should be updated or not. If the selected echo cancelling procedure is currently applied, it is not necessary to update the echo cancelling procedure, and the procedure returns to step 500 to continue receiving the indication of the available processing capacity of the terminal. If instead the selected echo cancelling procedure is not currently applied, it is decided in step 504 to update the echo cancelling procedure. Then, in step 506 the currently applied echo cancellation procedure is replaced by the selected echo cancelling procedure. In an optional next step 508, the algorithm of the NLP may also be updated accordingly, if used. Finally, the procedure returns to step 500 and continues to receive the indication of the available processing capacity of the terminal.

Figure 6:
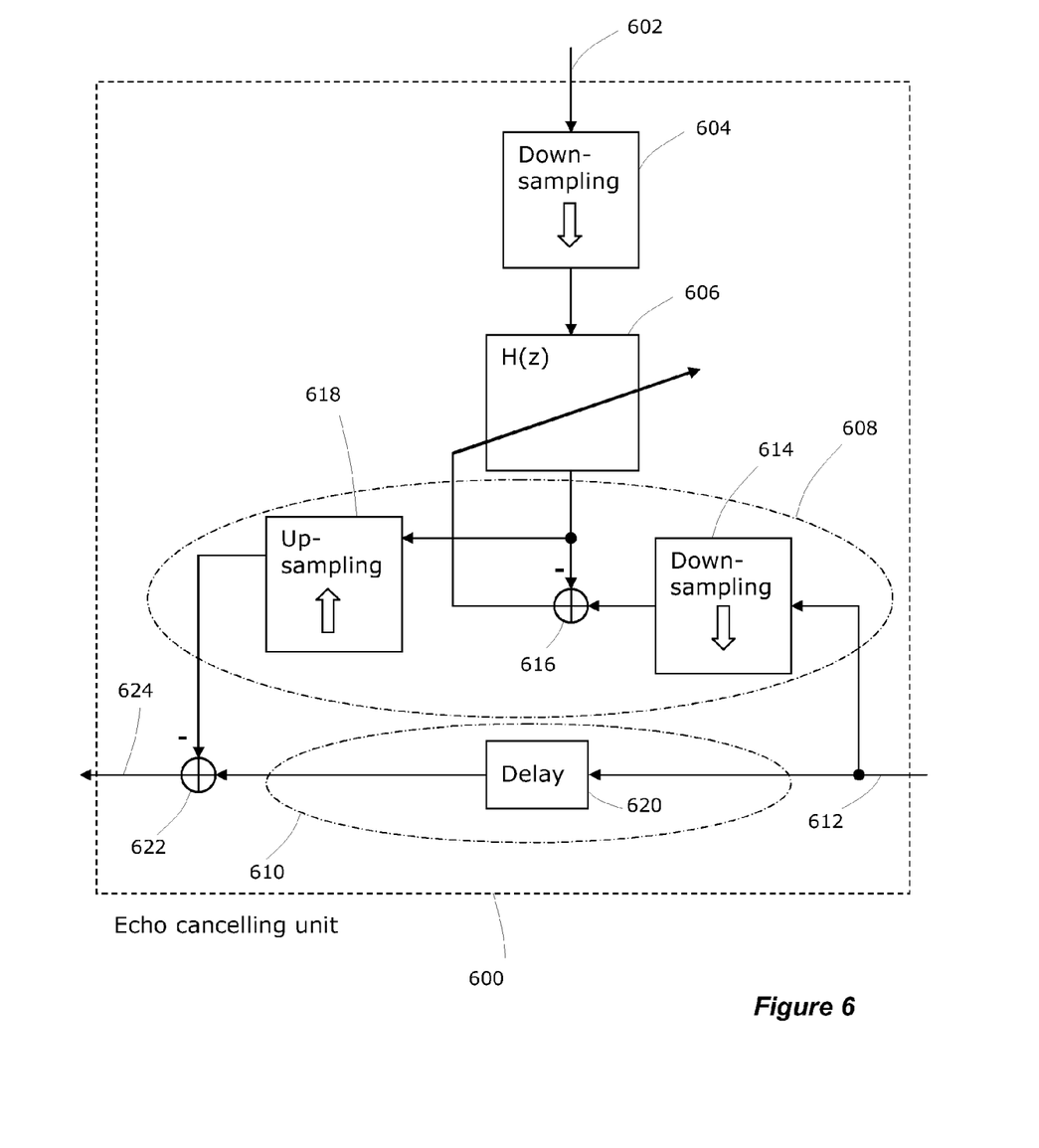
FIG. 6 is a block diagram illustrating an echo cancellation unit, in accordance with yet another embodiment.

With reference to FIG. 6, an embodiment of an echo cancelling unit will now be described with further reference to FIG. 4. The echo cancelling unit 600 (also referred to as 416 in FIG. 4) is capable of applying a plurality of selectable echo cancelling procedures 416a, 416b, . . . . When applying a specific echo cancelling procedure, the echo cancelling unit 600 will work as follows: The echo cancelling unit takes as input 602 the speech signals from the incoming communication link 402, and as input 612 the output signals from the A/D-converter 414. The unit 600 feeds the signals of its output 624 as input to the NLP 422. The incoming signals of input 612 are fed into two branches, an estimating branch 608 and a speech branch 610.

The input signals of the inputs 602 and 612 are down-sampled with a factor i by the down-samplers 604 and 614, respectively. The down-sampling factor i can be an integer value (2, 3, 4, . . . , n), e.g. a down-sampling factor 2 from 24 kHz to 12 kHz, or a down-sampling factor 3 from 24 kHz to 8 kHz. However, the down-sampling factor i can also be any other suitable value, e.g. a decimal number. Each value for the down-sampling factor i represents a separate echo cancelling procedure.

The unit 600 has a digital filter 606 which takes as input the output signals from the down-sampler 604 and produces a down-sampled echo estimate. The digital filter is adapted based on the output from the subtracter 616 for which the down-sampled output signals from the down-sampler 614 are fed as input. The filter coefficients in filter 606 are determined dynamically from the inputs and are updated continuously, due to the changing environment of the terminal 400. The filter processes the input signals from the down-sampler 604, resulting in an estimate of the part of the signals of the input 612 which originates from the loudspeaker 406 of terminal 400 and are affected by the environment of the terminal 400, down-sampled with the down-sampling factor. These down-sampled estimate signals will be fed as input signals to the subtracter 616, and also to an up-sampler 618. The up-sampler 618 up-samples the input signals with the same factor i as the down-sampling operation was performed with. The output signals from the up-sampler 618 are an estimate of the part of the microphone signals on the input 612, originating from the loudspeaker 406 of terminal 400. These microphone signals are affected by the environment of the terminal 400.

The required processing capacity for the echo cancelling can be adjusted, due to the available processing capacity of the terminal 400, by varying the down-sampling factor i. Both the down-sampling and up-sampling operations are performed with this factor i. A higher down-sampling factor i requires a relatively smaller amount of processing capacity, and a lower sampling rate requires a relatively larger amount of processing capacity.

However, the processing of the signals of the input 612 in the estimating branch 608 results in a delay, due to down-sampling and up-sampling and possible delay in the process of estimating the echo. Therefore, in the speech branch 610, a delay circuit 620 is adapted to take as input the signals of the input 612, and to produce the same delay as for the estimating branch 608. The output signals from the up-sampler 618 are fed as a first input to a subtracter 622, and the output signals from the delay circuit 620 are fed as a second input to the subtracter 622. The subtracter 622 subtracts the signals of its first input from the signals of its second input, i.e. the output signals of the estimating branch 608 from the output signals of the speech branch 610, resulting in echo reduced signals 624 on its output. Finally, these echo reduced signals are fed as input to the NLP 422.

The other selectable echo cancelling units can be any suitable echo cancelling units and are not defined in detail in this description.

By means of the present invention, a flexible method for echo cancelling is obtained, optimising the speech quality without compromising the processing requirements of other activities in the terminal. Using the above described solution, the echo cancelling can be performed for a relatively lower frequency range, where a majority of the echoes is present. Moreover, it is not necessary to combine the frequency ranges into a composite signal, which is otherwise complicated and requires large amount of processing capacity.

While the invention has been described with reference to specific exemplary embodiments, the description is in general only intended to illustrate the inventive concept and should not be taken as limiting the scope of invention. Although mobile terminals or mobile phones have been used throughout when describing the above embodiments, any other terminals for voice communication over a digital communication link may be used in the manner described. Although the method FIR-NLMS is used in the embodiments herein, any other suitable adaptive or non-adaptive filtering methods can also be used for estimating the echoes of the microphone signals.

The invention is generally defined by the following independent claims.

The invention claimed is:

1. A method for canceling echoes in a communication terminal during a voice call with an opposite party, the terminal comprising a loudspeaker and a microphone, the method comprising the following steps being executed by an echo canceling unit in the terminal:
   a) receiving speech signals from the microphone on a first input of the echo canceling unit, said speech signals from the microphone referred to as microphone signals;
   b) feeding the received microphone signals into a first branch and a second branch;
   c) receiving speech signals from the opposite party on a second input of the echo canceling unit;
   d) producing, in the first branch, a first estimate of an echo information in the microphone signals, based on the received microphone signals and the received speech signals from the opposite party;
   e) performing a subtraction wherein the produced first estimate is subtracted from the signals fed into the second branch; and
   f) outputting the result from the subtraction from the echo canceling unit; and
   wherein the step of producing a first estimate further comprises the following sub-steps:
   down-sampling the received microphone signals in the first branch with a down-sampling factor i;
   down-sampling the received speech signals from the opposite party with the down-sampling factor i;
   producing a down-sampled second estimate of the echo information in the microphone signals, by filtering the down-sampled speech signals from the opposite party in a digital filter; and
   producing the first estimate by up-sampling the second estimate with an up-sampling factor i, equal to the down-sampling factor i.

2. A method according to claim 1, wherein the down-sampling and up-sampling factor i is selected from a plurality of values, where each of the values represents a separate available echo canceling procedure.

3. A method according to claim 2, wherein the available echo canceling procedures require different amounts of processing capacity of the terminal, and the echo canceling procedure is selected based on the currently available processing capacity of the terminal.

4. A method according to claim 3, wherein the step of selecting echo canceling procedure further comprises replacing a currently used echo canceling procedure with the selected echo canceling procedure, if the currently used echo canceling procedure is not the same as the selected echo canceling procedure.

5. A method according to claim 1, wherein the signals fed into the second branch are delayed by a time t before the subtraction in step e), the time t being equal to the time delay introduced in the production of the first estimate.

6. A method according to claim 1, wherein the digital filter is adaptive and the difference between the down-sampled microphone signals and the second estimate is used for adapting the filter.

7. A method according to claim 1, wherein any remaining echoes in the output signals from the echo canceling unit are suppressed by an echo suppressor.

8. An arrangement in a communication terminal, for canceling echoes during a voice call with an opposite party before transferring speech signals to the opposite party, comprising an echo canceling unit having:
   a) an first input adapted to receive speech signals from a microphone of the terminal, said speech signals from the microphone referred to as microphone signals;
   b) a second input adapted to receive speech signals from an opposite party;
   c) a first branch adapted to receive the microphone signals on the first input, and produce a first estimate of an echo information in the microphone signals, based on the received microphone signals and the received speech signals from the opposite party;
   d) a second branch adapted to receive the microphone signals on the first input; and
   e) a subtracter adapted to perform a subtraction where the first estimate produced in the first branch is subtracted from the signals of the second branch, before being outputted from the echo canceling unit; and
   wherein the echo canceling unit also comprises:
   a first down-sampler adapted to down-sample the received microphone signals in the first branch with a down-sampling factor i;
   a second down-sampler adapted to down-sample the received speech signals from the opposite party with the down-sampling factor i;
   a digital filter adapted to produce a second estimate of the echo information in the microphone signals, by filtering the down-sampled speech signals from the opposite party; and;
   an up-sampler adapted to produce the first estimate by up-sampling the second estimate with an up-sampling factor i, equal to the down-sampling factor i.

9. An arrangement according to claim 8, wherein the down-sampling factor i is selectable from a plurality of values, where each value of i represents a separate available echo canceling procedure.

10. An arrangement according to claim 9, comprising a capacity indicator adapted to indicate the currently available processing capacity of the terminal, and a control unit adapted to select one of the available echo canceling procedures, based on the indicated currently available processing capacity, wherein the available echo canceling procedures require different amounts of processing capacity of the terminal.

11. An arrangement according to claim 10, wherein the control unit is also adapted to replace a currently used echo canceling procedure with the selected echo canceling procedure, if the currently used echo canceling procedure is not the same as the selected echo canceling procedure.

12. An arrangement according to claim 8, comprising a delay circuit in the second branch that is adapted to delay the received microphone signals by a time t before said subtraction by the subtracter, the time t being equal to the time delay introduced in the production of the first estimate.

13. An arrangement according to claim 8, wherein the digital filter is adaptive based on the difference between the down-sampled microphone signals and the second estimate.

14. An arrangement according to claim 8, further comprising an echo suppressor adapted to suppress any remaining echoes in the output signals from the echo canceling unit.

15. A method for canceling echoes in a communication terminal during a voice call with an opposite party, the terminal comprising a loudspeaker and a microphone, the method comprising the following steps being executed by an echo canceling unit in the terminal:
   a) receiving information about the processing capacity currently available in the terminal;
   b) selecting a suitable echo canceling procedure based on the currently available processing capacity; and
   c) applying the selected echo canceling procedure, wherein the echo canceling procedure is selected from a plurality of selectable echo canceling procedures in the echo canceling unit, which is adapted to use different echo canceling procedures; and
   wherein and the echo canceling procedure further comprises the following sub-steps:
   down-sampling incoming speech signals on a communication link;
   filtering the down-sampled signals in an adaptive filter;
   up-sampling the signals filtered by the adaptive filter; and
   subtracting the up-sampled signals from speech signals coming from the microphone.

16. A method according to claim 15, wherein step b) further comprises replacing a currently used echo canceling procedure with the selected echo canceling procedure if the currently used echo canceling procedure is not the same as the selected echo canceling procedure.

17. A method according to claim 15, wherein the selected echo canceling procedure comprises the following steps:
   a) receiving speech signals from the microphone on a first input of the echo canceling unit, said speech signals from the microphone referred to as microphone signals;
   b) feeding the received microphone signals into a first branch and a second branch;
   c) receiving speech signals from the opposite party on a second input of the echo canceling unit;
   d) producing, in the first branch, a first estimate of an echo information in the microphone signals, based on the received microphone signals and the received speech signals from the opposite party;
   e) performing a subtraction, where the produced first estimate is subtracted from the microphone signals fed into the second branch; and
   f) outputting the result from the subtraction from the echo canceling unit.

18. A method according to claim 17, wherein the signals fed into the second branch are delayed by a time t before the first subtraction, the time t having the same length as the time it takes to produce the first estimate.

19. A method according to claim 17, wherein the step of producing a first estimate further comprises the following sub-steps:
- down-sampling the received microphone signals in the first branch by a factor i;
- down-sampling the received signals from the opposite party by the factor i;
- producing a down-sampled second estimate of the echo information in the microphone signals, by filtering the down-sampled speech signals from the opposite party in a digital filter; and
- producing the first estimate by up-sampling the second estimate.

20. A method according to claim 19, wherein the digital filter is adaptive and the difference between the down-sampled microphone signals and the second estimate is used for adapting the filter.

21. An arrangement in a communication terminal for canceling echoes during a voice call with an opposite party, comprising:
- a) a capacity indicator adapted to indicate the currently available processing capacity of the terminal;
- b) a control unit adapted to select one available echo canceling procedure from a plurality of selectable echo canceling procedures, based on the currently available processing capacity; and
- c) an echo canceling unit adapted to apply the selected echo canceling procedure; and wherein the echo canceling unit is configured according to the selected echo canceling procedure to:
- down-sample incoming speech signals on a communication link;
- filter the down-sampled signals in an adaptive filter;
- up-sample the signals filtered by the adaptive filter; and
- subtract the up-sampled signals from speech signals coming from the microphone.

22. An arrangement according to claim 21, wherein the control unit is also adapted to replace a currently used echo canceling procedure with the selected echo canceling procedure if the currently used echo canceling procedure is not the same as the selected echo canceling procedure.

23. An arrangement according to claim 21, wherein the echo canceling unit comprises:
- a) an first input adapted to receive signals from a microphone of the terminal, said signals from the microphone referred to as microphone signals;
- b) a second input adapted to receive speech signals from an opposite party;
- c) a first branch adapted to receive the microphone signals on the first input, and produce a first estimate of an echo information in the microphone signals, based on the received microphone signals and the received speech signals from the opposite party;
- d) a second branch adapted to receive the microphone signals on the first input;
- e) a subtracter adapted to perform a subtraction, where the first estimate produced in the first branch will be subtracted from the signals of the second branch, before being outputted from the echo canceling unit.

24. An arrangement according to claim 23, comprising a delay circuit in the second branch is adapted to delay the received microphone signals by a time t before the first subtraction, the time t having the same length as the time it takes to produce the first estimate.

25. An arrangement according to claim 23, wherein the echo canceling unit comprises:
- a first down-sampler adapted to down-sample the received microphone signals in the first branch with a down-sampling factor i;
- a second down-sampling means adapted to down-sample the received speech signals from the opposite party with the down-sampling factor i;
- a digital filter adapted to produce a second estimate of the echo information in the microphone signals, by filtering the down-sampled speech signals from the opposite party; and
- an up-sampler adapted to produce the first estimate by up-sampling the second estimate with an up-sampling factor i, equal to the down-sampling factor i.

26. An arrangement according to claim 25 wherein the digital filter is adaptive based on the difference between the down-sampled microphone signals and the second estimate.

* * * * *

UNITED STATES PATENT AND TRADEMARK OFFICE
CERTIFICATE OF CORRECTION

PATENT NO. : 8,538,034 B2  
APPLICATION NO. : 12/744733  
DATED : September 17, 2013  
INVENTOR(S) : Eriksson et al.

Page 1 of 1

It is certified that error appears in the above-identified patent and that said Letters Patent is hereby corrected as shown below:

In the Specification

In Column 8, Line 14, delete "terminal 410" and insert -- terminal 400 --, therefor.

In the Claims

In Column 11, Line 55, in Claim 8, delete ";and;" and insert -- ; and --, therefor.

Signed and Sealed this  
Eleventh Day of February, 2014

Michelle K. Lee  
*Deputy Director of the United States Patent and Trademark Office*